(12) United States Patent
Kainthla

(10) Patent No.: US 6,646,423 B2
(45) Date of Patent: Nov. 11, 2003

(54) FORMATION PROCEDURE FOR ALKALINE NICKEL-ZINC CELLS

(75) Inventor: Ramesh C. Kainthla, College Station, TX (US)

(73) Assignee: Rechargeable Battery Corporation, College Station, TX (US)

( * ) Notice: Subject to any disclaimer, the term of this patent is extended or adjusted under 35 U.S.C. 154(b) by 52 days.

(21) Appl. No.: 10/056,783

(22) Filed: Jan. 23, 2002

(65) Prior Publication Data

US 2003/0137282 A1 Jul. 24, 2003

(51) Int. Cl.$^7$ ............................... H02J 7/00; H02J 7/04
(52) U.S. Cl. ........................................ 320/161; 320/128
(58) Field of Search ........................ 320/128, 120, 320/130, 131, 133, 149, 151, 152, 155, 160, 161; 429/229–231, 206, 223; 324/427, 433

(56) References Cited

U.S. PATENT DOCUMENTS 4,358,517 A * 11/1982 Jones .......................... 429/229
4,503,378 A * 3/1985 Jones et al. .................. 320/161
6,265,877 B1 * 7/2001 Kimura et al. .............. 320/136

* cited by examiner

Primary Examiner—Edward H. Tso
Assistant Examiner—Pia Tibbits
(74) Attorney, Agent, or Firm—Factor & Partners

(57) ABSTRACT

The present invention comprises a formation procedure for alkaline nickel-zinc cells, the procedure comprising the steps of assembling an alkaline nickel-zinc cell, charging the cell at a charging current rate until a first condition is achieved, wherein at the first condition the cell has a first cell voltage, maintaining the cell at the first cell voltage while applying a maintenance current to the cell until a second condition is achieved, and discharging the cell at a discharging current rate until a third condition is achieved, wherein the steps of charging, maintaining and discharging are repeated at least one time, and, thereafter the cell is finally charged at a final charging rate until the final condition is achieved.

23 Claims, 1 Drawing Sheet

FORMATION PROCEDURE FOR ALKALINE NICKEL-ZINC CELLS

FEDERALLY SPONSORED RESEARCH

This invention was made with United States Government support under contract number 70NANB9H3031, awarded by the National Institute of Standards and Technology (NIST).

The United States Government has certain rights in the invention.

BACKGROUND

1. Field of the Invention

The present invention relates generally to alkaline nickel-zinc cells and their preparation, and specifically to the formation/activation procedures for nickel-zinc cells.

2. Background Art

Rechargeable cells such as, for example, Nickel/Zinc, Silver/Zinc, Zinc/Air and Manganese-dioxide/Zinc, containing zinc electrodes are of significant interest due to the abundance and, therefore, low cost of zinc, as well as low equivalent weight, high Coulombic efficiency, reversible electrochemical behavior, and reduced environmental disposal problems (e.g., in comparison to lead or cadmium).

Before use as an individual cell or as a group of cells in a battery pack, Nickel-Zinc cell/s needs to be formed. Many inventions have identified different procedures with the hope of forming the Nickel-Zinc cell/s with uniform characteristics (for example initial discharge capacity). For example, Pyun, et al. (U.S. Pat. No. 5,563,008 dated Oct. 8, 1996) describes a procedure in which a nickel electrode is first charged and discharged outside the cell before assembly in to the actual cell. The procedure obviously involves an extra external processing step, requiring additional cells to carry out the procedure. The electrode needs to be washed and dried before assembling into the actual cell, which leads to an increase in the assembly time and cost.

Terasaka, et al. (U.S. Pat. No. 5,405,714 dated Apr. 11, 1995) describes a method to form Ni—Zn cells using non-sintered type Nickel positive electrodes, in which the cells are rested at room temperature until their potential drops to the equilibrium potential of $Co/Co(OH)_2$ (about 0.50–0.60 volts). However, at this potential, Co is soluble in KOH, and the resulting soluble species migrates over to the zinc electrode—leading to deposition of Co on the zinc electrode. Deposition of Co on Zn forms a Co/Zn micro-cell that leads to discharge of the zinc electrode and formation of hydrogen gas. This step is also a time consuming step as the cell potential has to reach the rest potential on its own.

Thus, there is a need for a formation procedure that can be applied to a complete assembled cell as well as a procedure that is applicable to Nickel-Zinc cells made with non-sintered and sintered nickel cathodes.

SUMMARY OF THE INVENTION

The present invention comprises a formation procedure/process for alkaline nickel-zinc cells, the procedure comprising the steps of a) assembling an alkaline nickel-zinc cell, b) charging the cell at a charging current rate until a first condition is achieved, wherein at the first condition the cell has a first cell voltage, c) maintaining the cell at the first cell voltage while applying a maintenance current to the cell until a second condition is achieved, and d) discharging the cell at a discharging current rate until a third condition is achieved, wherein the steps of charging, maintaining and discharging are repeated at least one time, and, thereafter e) the cell is finally charged at a final charging rate until the final condition is achieved. Through this process, the nickel-zinc cell can have improved cycle life, and more uniform cell properties, which make them suitable for use in a battery pack.

In the current procedure, the charging current rate is between approximately 0.05C and approximately 0.2C, and preferably the charging current rate is approximately 0.1C. The charging current is applied to the cell until the first condition is achieved, wherein the first condition can comprise either the passage of a period of time or a specific cell voltage. If the first condition comprises the passage of a period of time, it preferably comprises a period of time between approximately 7.5 hours and 30 hours, and even more preferred the period of time comprises approximately 15 hours. On the other hand, if the first condition comprises a cell voltage, it preferably comprises a cell voltage of between approximately 1.95 Volts/cell and 2.05 Volts/cell, and even more preferably comprises a cell voltage of approximately 2.02 Volts/cell.

After the charging step is the maintaining step. In this step, the cell is maintained at a specific voltage until the second condition is met. Preferably, the second condition comprises maintaining the cell at the specific cell voltage for a period of time between 10 minutes and 30 minutes, and even more preferably a period of time of approximately 20 minutes. Alternatively, the second condition comprises maintaining the cell at the specific cell voltage until the maintenance current rate drops to between approximately 0.01C and approximately 0.03C, and even more preferably to 0.02C.

The discharging step follows the maintaining step. In this step, the cell is discharged at a constant discharge current rate until a third condition is achieved. Preferably, the discharge current rate is between approximately 0.4C and approximately 0.6C, and even more preferably comprises a current rate of 0.5C. The third condition comprises the passage of a period of time, preferably a period of time of between approximately 2 and 3 hours, and even more preferably the period of time comprises approximately 2.5 hours.

Once the steps of charging, maintaining and discharging are completed, it is preferred that those steps are repeated between 2 and 4 times, and more preferably that those steps are repeated 3 times.

After the steps have been repeated, the step of final charging occurs. The final charging step requires the application of a final charging current rate for a period of time. Preferably, the final charging rate is between approximately 0.05 and 0.2C, and even more preferably is approximately 0.1C. This current is applied until the final condition is achieved. The final condition may be achieved either by the passage of a period of time or by a specific cell voltage. If the final condition comprises the passage of time, the period of time preferably comprises between approximately 7.5 hours and 30 hours, and even more preferably comprises 15 hours. If the specific cell voltage is used, the final condition preferably comprises a cell voltage of between approximately 1.95 Volts/cell and 2.05 Volts/cell, and even more preferably comprises approximately 2.02 Volts/cell.

DETAILED DESCRIPTION OF THE INVENTION

Figure 1:
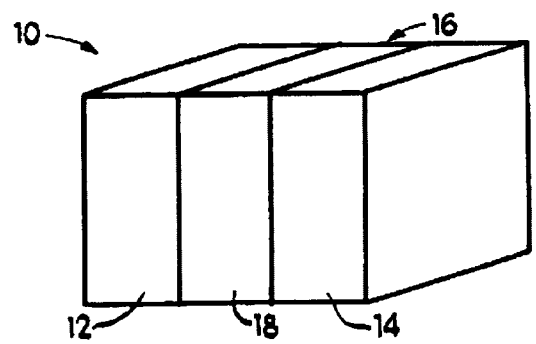
FIG. 1 comprises a three-dimensional view of a typical nickel-zinc cell.

While this invention is susceptible of embodiment in many different forms, there is shown in the drawings and will be described in detail, several specific embodiments with the understanding that the present disclosure is to be considered as an exemplification of the principles of the invention and is not intended to limit the invention to the embodiments illustrated.

The present invention comprises a procedure/process for forming or activating nickel-zinc battery cells so as to increase the cycle life of the cells while raising the consistency in the initial charge capacity and overall performance of those cells. In order to accomplish these goals, it is necessary to a) assemble an alkaline nickel-zinc cell, b) charge the cell at a charging current rate until a first condition is achieved, wherein at the first condition of the cell has a first cell voltage, c) maintain the cell at the first cell voltage while applying a maintenance current to the cell until a second condition is achieved, and d) discharging the cell at a discharging current rate until a third condition is achieved. Thereafter, the steps of charging, maintaining and discharging are repeated at least one time, and the cell is finally charged at a final charging rate until the final condition is achieved. Through these steps, the above goals, among others, can be accomplished.

Generally, the step of assembling can take place in a number of different ways. As can be seen in FIG. 1, typical nickel-zinc cells 10 comprise positive electrode 12, negative electrode 14, with separator 16 in-between. Separator 16 also typically comprises an electrolyte. Positive electrode 12 includes some form of nickel, usually nickel hydroxide, which is applied to a conducting alkaline resistant metal screen, or incorporated in to metal foam. Negative electrode 14 is usually constructed from a form of zinc, such as zinc oxide and zinc metal powder, and generally rolled into an electrode strip or other, similar, flat structures. The zinc/zinc oxide active mass is then applied to a metal current collector. Separator 16 comprises a number of possible materials, such as a microporous membrane, Celgard material, Cellophane, or PVA. The separator also generally comprises electrolyte material 18, such as potassium hydroxide. The cells are assembled using any number of known techniques, wrapping positive electrode 12 with separator 16 and then placing with negative electrode 14. Once assembled, cell 10 is ready for the formation/activation steps.

It should be noted that the present procedure is for use with a wide variety of nickel-zinc cells, incorporating any number of types of positive and negative electrodes. For example, the nickel electrode, or positive electrode, can comprise a pocket-plate electrode, sintered-nickel electrode, non-sintered nickel electrode, or even a nickel electrode using a lightweight substrate such as controlled micro geometry foil electrode or nickel foam. Similarly, the present procedure can be used with any number of assembled nickel-zinc cells such as prismatic cells, cylindrical cells, sealed cells, and the like.

The formation/activation steps include the steps of charging, maintaining, and discharging the cell. These steps, repeated a specific number of times, comprise the main component of the current process. Generally, the steps involve charging the cell for a period of time (or, alternatively, to a specific cell voltage), maintaining the cell at the end voltage while continuing to apply a current to the cell for a period of time (or, alternatively, till the maintenance current drops to a specific value), and then discharging the cell for a period of time. Thereafter, these steps are repeated a specific number of times, leaving the cell in a discharged state before a final charge, placing the cell in condition for use.

The initial step in the formation/activation steps is the charging step. In order to charge the cell, it is necessary to apply a current across the cell for a period of time. The present method works best within a range of charging current rates, especially between 0.05 and 0.2C. Preferably, the cell should be charged at a rate of 0.1C. The charging current is applied long enough to reach the end condition of the charging step, called the first condition.

The first condition can be measured in one of two different ways, either by a measured amount of time or by an end voltage state of the cell. If the first condition is dictated by a measured amount of time, the charging current is applied for a time period of between 7.5 hours and 30 hours, and preferably applied for a period of 15 hours. Alternatively, if the first condition is dictated by the voltage measurement of the cell, the charging current is applied until the cell voltage is between 1.95 and 2.05 Volts, and preferably until the cell reaches 2.02 Volts. Preferably, the first charge state can be measured by a combination of the two conditions, that is until either the voltage of the cell reaches approximately 2.02 Volts, or until 15 hours pass, whichever occurs first.

After the cell has reached the first condition, the maintenance step commences. In this step, the voltage of the cell is maintained while the current is continually applied. If the voltage of the cell is maintained, as the charge state of the cell increases, the current level drops. Therefore, the maintenance current actually decreases as it is applied. The current level is allowed to drop until the second condition is reached. The second condition is measured by the current rate, which signals the second condition by dropping to between 0.01 and 0.03C. Preferably, the maintenance step continues until the applied current drops to 0.02C. Alternatively, the second condition may be achieved by charging the cell for a specific amount of time. In that case, the maintenance current is applied for a time period of between 10 minutes and 30 minutes, and preferably applied for a period of 20 minutes. Generally, the second charge state can be measured by a combination of the above two conditions, that is until either the maintenance current drops to approximately 0.02C, or until 20 minutes pass, whichever occurs first.

Once the second condition has been achieved, the discharge step is started. In this step, the now charged cell is discharged at a discharge current rate until the third condition is reached. The discharge current rate is applied within a range of current rates, preferably between 0.4 and 0.6C. The present method operates best when the discharge current rate is 0.5C Coulombs. This rate is continued, draining the cell of potential energy for between 2 and 3 hours, but preferably for 2.5 hours. Thereafter, the cell should be, again, in an uncharged state, ready for recharging and further conditioning.

The steps of charging, maintaining, and then discharging are repeated at least one more time. Preferably, the steps are additionally repeated a third time, and may be repeated a fourth time also. Each step of the process helps to condition and prepare the stack for improved cycle time and performance. Specifically, each step helps to condition the cell by converting the initial battery components, namely zinc oxide and nickel hydroxide, into zinc and nickel oxy-hydroxide. These species provide cell structure, as well as creating charge pathways within the cell itself. Each cycle improves the ability of the charging current to be absorbed by the cell, as well as the uniformity of the distribution of the current throughout the cell. Thus, cycling the steps of charging, maintaining and discharging allows the cell to have a greater charge capacity, as well as a more uniform and standardized charged structure, increasing cycle life and cycle consistency. After the steps have been repeated the determined number of times, the cell ends in a discharged condition, and is activated/formed and ready for the final charge step.

In the final charge step, the cell is charged to the final condition using the final charging current rate. Similar to the charging step of the formation/activation steps, the final charging current rate is applied at between approximately 0.05 and 0.2C, and is preferably applied at a current of 0.1C. The current is continuously applied until the final condition is reached. The final condition can be measured either by a measured amount of time, or by the voltage state of the cell. Therefore, the final charging current is applied either for a time period of between 7.5 and 30 hours (preferably 15 hours), or until the cell voltage is between 1.95 and 2.05 Volts (preferably 2.02 Volts). As with the charging step, both measures of the final condition can be used simultaneously, with the final charging current being applied until the first of the period of time passes or the final voltage of the cell is reached. Once fully charged, the nickel-zinc cell is prepared for use, with all of the benefits discussed herein.

Figure 2:
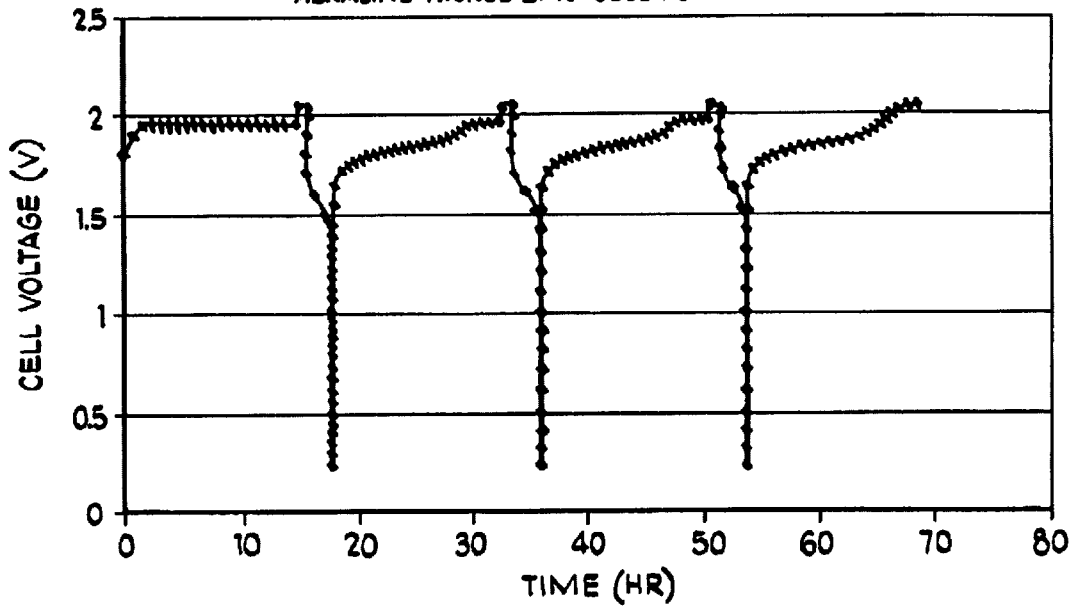
FIG. 2 comprises a chart of cell voltage vs. time, as measured during the application of the present procedure.
Figure 3:
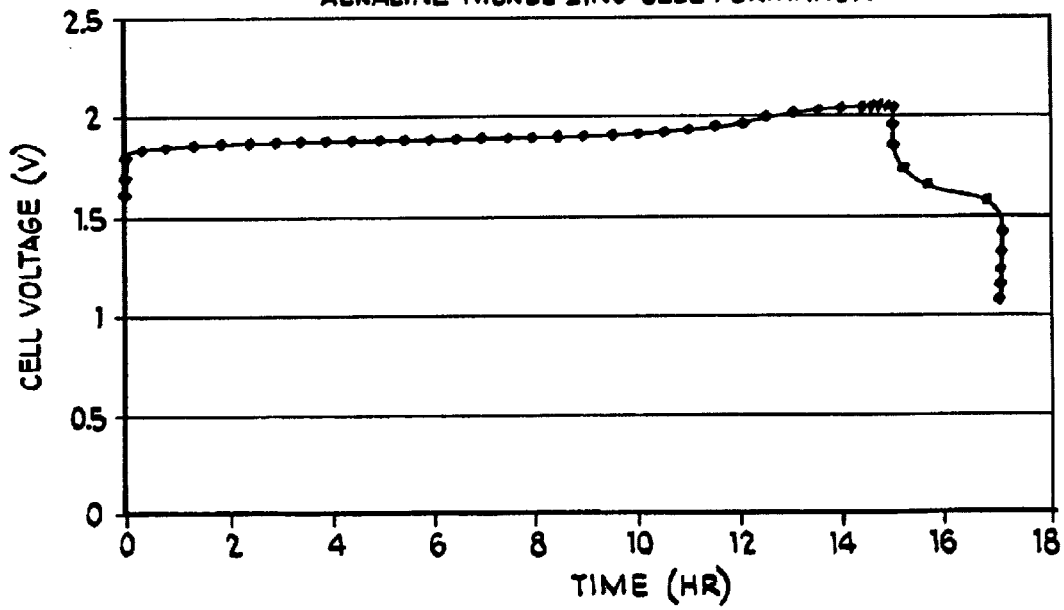
FIG. 3 comprises a chart of cell voltage vs. time, as measured during a typical formation/activation procedure.

FIGS. 2 and 3, enclosed herein, depict the cell voltages of two nickel-zinc cells during the formation processes of each. FIG. 2 depicts the present process, showing the charging, maintaining and discharging process of the present invention, repeated a total of three times before final charging. FIG. 3 shows a typical formation process for nickel/zinc cells. As will be illustrated in the Examples given below, the present process produces a superior nickel-zinc cell, with improved cycle life and more uniform cell characteristics.

EXAMPLE 1

The alkaline nickel-zinc cells were assembled with sintered nickel cathode and zinc anode electrodes made using the procedure given in patent application Ser. No. 10/006,793 filed Dec. 6, 2001.

The sintered nickel electrodes were cut in to 73.025 mm×48.25 mm pieces. A Nickel tab of 0.5 mm thickness was spot welded on to one corner of the nickel electrodes. All of the electrodes were then wrapped in one Freudenberg absorber FS2119 and heat-sealed in three layers of SciMat 31/08 separator with the top open. The zinc electrodes were also wrapped in one layer each of Freudenberg absorber FS2119. Five Nickel electrodes, four full and two half Zinc electrodes were assembled in a polysulfone case with the symmetrical configuration: (1/2 Zn)/Ni/Zn/Ni/Zn/Ni/Zn/Ni/Zn/Ni/(1/2 Zn). The cell was then filled with an electrolyte containing 20% KOH+1% LiOH. The expected capacity of each of the cells was 5.0Ah.

The cell was activated using the present invention. After activation the cell was discharged at a constant current of 5A (1C) to a cell voltage of 1.37V. The discharge capacity was determined to be 5.7Ah; substantially higher than the expected capacity of 5Ah.

EXAMPLE 2

A group of four alkaline Nickel-Zinc cells were assembled with sintered Nickel cathode and Zinc anode electrodes, as described in EXAMPLE 1.

The cells were activated using the present invention. After activation, the cells were put through a cycle life test. They were discharged at a constant current of 5A (equivalent to a 1C rate) to a final cell voltage of 1.37V, and then charged again at a current of 1.667A (equivalent to C/3 rate). The initial discharge capacities and capacities at the $100^{th}$ discharge are given in Table 1. As can be seen, all four cells have capacities very close to each other, demonstrating that the invented activation procedure leads to uniform cell performance characteristics.

TABLE 1

Capacities at $1^{st}$ and $100^{th}$ discharge for a group of alkaline sintered Nickel - Zinc cells formed using the invented formation procedure.

|  | Discharge Capacities (Ah) | | | |
| --- | --- | --- | --- | --- |
| Discharge # | Cell #1 | Cell #2 | Cell #3 | Cell #4 |
| 1 | 5.62 | 5.69 | 5.57 | 5.56 |
| 100 | 4.54 | 4.45 | 4.47 | 4.48 |

EXAMPLE 3

A group of three alkaline Nickel-Zinc cells were assembled with non-sintered (pasted) Nickel cathode and Zinc anode electrodes, as described in EXAMPLE 1.

The cells were activated using the present invention. After activation the cells were put through a cycle life test. They were discharged at a current of 5A (equivalent to a 1C rate) to a final cell voltage of 1.37V, and then charged again at a current of 1.667A (C/3 charge rate). The initial discharge capacities and capacities at the $50^{th}$ discharge are given in Table 2. Again, as can be seen, all three of the tested cells have capacities very close to each other, showing that the activation procedure of the present invention leads to uniform cell characteristics in a group of cells assembled with non-sintered Nickel cathodes.

TABLE 2

Capacities at $1^{st}$ and $50^{th}$ discharge for a group of alkaline non-sintered Nickel - Zinc cells formed using the invented formation procedure.

|  | Discharge Capacities (Ah) | | |
| --- | --- | --- | --- |
| Discharge # | Cell #1 | Cell #2 | Cell #3 |
| 1 | 5.62 | 5.62 | 5.59 |
| 50 | 4.53 | 4.54 | 4.60 |

EXAMPLE 4

To compare the performance enhancements as a result of present invention, a group of three alkaline Nickel-Zinc cells were assembled with sintered Nickel cathode and Zinc anode electrodes, as described in EXAMPLE 1

The cells were activated using a different procedure than the present invention. They were charged at 0.1C rate for 15 hrs. or to an equivalent cell voltage of 2.02V, followed by constant voltage charging at 2.02V till the current dropped to 0.02C or till 20 minutes had passed. The cells were then discharged at a rate of 0.5C to a final cell voltage of 1.1V (FIG. 3).

After activation the cells were put through a cycle life test. They were charged at a current rate of 0.1C for 15 hrs. or to an equivalent cell voltage of 2.02V, followed by the same schedule as used in examples 2 & 3 above. The initial discharge capacities and capacities at the 100$^{th}$ discharge are given in Table 3. The results showed lot of variation in cell capacity from cell to cell initially as well as at 100$^{th}$ discharge. Moreover, the initial capacities of the cells are substantially lower than the expected capacity of 5Ah, showing that the cells were not activated properly.

TABLE 3

Capacities at 1$^{st}$ and 100$^{th}$ discharge for a group of alkaline sintered Nickel - Zinc cells formed using a generic formation procedure.

| Discharge # | Discharge Capacities (Ah) | | |
|---|---|---|---|
| | Cell #1 | Cell #2 | Cell #3 |
| 1 | 3.72 | 4.43 | 4.28 |
| 100 | 4.03 | 3.64 | <3.5 |

As can be seen from the previous examples, the present invention offers an improved procedure for activation of nickel-zinc cells. Through this procedure, the initial charge capacity and cycle life are improved, and the overall cycle characteristics are made more uniform. Contrarily, as shown in Example 4 above, conventional activation procedures leave the nickel-zinc cells with lesser capacity, and less reproducible results from cell to cell.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A formation process for alkaline nickel-zinc cells, the process comprising the steps of:
   assembling an alkaline nickel-zinc cell;
   charging the cell at a charging current rate until a first condition is achieved, wherein at the first condition the cell has a first cell voltage;
   maintaining the cell at the first cell voltage while applying a maintenance current to the cell until a second condition is achieved; and
   discharging the cell at a discharging current rate until a third condition is achieved;
   wherein the steps of charging, maintaining and discharging are repeated at least one time, and, thereafter the cell is finally charged at a final charging rate until a final condition is achieved.

2. The process according to claim 1, wherein the step of charging the cell at a charging current rate comprises the step of charging the cell at a current rate between approximately 0.05C and approximately 0.2C.

3. The procedure according to claim 2, wherein the step of charging the cell at a current rate between approximately 0.05C and approximately 0.2C comprises the step of charging at a current rate of approximately 0.1C.

4. The procedure according to claim 1, wherein the step of charging the cell until a first condition is achieved comprises the step of charging the cell until a period of time between approximately 7.5 hours and approximately 30 hours has passed.

5. The procedure according to claim 4, wherein step of charging the cell until a period of time between approximately 7.5 hours and approximately 30 hours has passed comprises the step of charging the cell until a period of time of approximately 15 hours has passed.

6. The procedure according to claim 1, wherein the step of charging the cell until a first condition is achieved comprises the step of charging the cell until the voltage of the cell is between approximately 1.95 Volts/cell and approximately 2.05 Volts/cell.

7. The procedure according to claim 6, wherein the step of charging the cell until the voltage of the cell is between approximately 1.95 Volts/cell and approximately 2.05 Volts/cell comprises the step of charging the cell until the voltage of the cell comprises approximately 2.02 Volts/cell.

8. The procedure according to claim 1, wherein the step of maintaining the cell at the first cell voltage until a second condition is achieved comprises the step of maintaining the cell at the first cell voltage until the maintenance current drops to between approximately 0.01C and approximately 0.03C.

9. The procedure according to claim 8, wherein the step of maintaining the cell at the first cell voltage until the maintenance current drops to between approximately 0.01 and approximately 0.03C comprises the step of maintaining the cell at the first cell voltage until the maintenance current rate drops to approximately 0.02C.

10. The procedure according to claim 1, wherein the step of maintaining the cell at the first cell voltage until a second condition is achieved comprises the step of maintaining the cell at the first cell voltage until a period of time of between approximately 10 and approximately 30 minutes has passed.

11. The procedure according to claim 10, wherein the step of maintaining the cell at the first cell voltage for period of time between approximately 10 and approximately 30 minutes comprises maintaining the cell voltage for approximately 20 minutes.

12. The procedure according to claim 1, wherein the step of discharging the cell at a discharging current rate comprises the step of discharging the cell at a discharge current rate between approximately 0.4C and approximately 0.6C.

13. The procedure according to claim 12, wherein the step of discharging the cell at a discharging current rate between approximately 0.4 and approximately 0.6C comprises discharge current rate of approximately 0.5C.

14. The procedure according to claim 1, wherein the step of discharging the cell until a third condition is achieved comprises the step of discharging the cell until a period of time between approximately 2 and approximately 3 hours has passed.

15. The procedure according to claim 14, wherein the step of discharging the cell until a period of time between approximately 2 and approximately 3 hours has passed comprises the step of discharging the cell until a period of time of approximately 2.5 hours has passed.

16. The procedure according to claim 1, wherein the step of repeating the steps of charging, maintaining and discharging at least one time comprises repeating the steps of charging, maintaining and discharging between 2 and 4 times.

17. The procedure according to claim 16, wherein the step of repeating the steps of charging, maintaining and discharging between 2 and 4 times comprises repeating the steps of charging, maintaining and discharging 3 times.

18. The procedure according to claim 1, wherein the step of finally charging the cell at a final charging rate comprises the step of finally charging the cell at a current rate of between approximately 0.05 and approximately 0.2C Coulombs.

19. The procedure according to claim 18, wherein the step of finally charging the cell at a current rate of between approximately 0.05 and approximately 0.2C comprises the step of finally charging the cell at a current charging rate of approximately 0.1C.

20. The procedure according to claim 1, wherein the step of finally charging the cell until the final condition is achieved comprises the step of finally charging the cell until a period of time between approximately 7.5 hours and approximately 30 hours has passed.

21. The procedure according to claim 20, wherein the step of finally charging the cell until a period of time between approximately 7.5 hours and approximately 30 hours has passed comprises finally charging the cell until a period of time of approximately 15 hours has passed.

22. The procedure according to claim 1, wherein the step of finally charging the cell until a final condition is achieved comprises the step of finally charging the cell until the cell comprises a cell voltage of between approximately 1.95 Volts/cell and approximately 2.05 Volts/cell.

23. The procedure according to claim 22, wherein the step of finally charging the cell until the cell comprises a cell voltage of between approximately 1.95 Volts/cell and approximately 2.05 Volts/cell comprises finally charging the cell until the cell voltage comprises approximately 2.02 Volts/cell.

* * * * *